Nov. 17, 1936.  C. BANCROFT  2,061,131
ROTARY ENGINE CONSTRUCTION
Filed Nov. 14, 1935  8 Sheets-Sheet 1

INVENTOR
Charles Bancroft
BY
Prindle, Bean & Mann
ATTORNEY

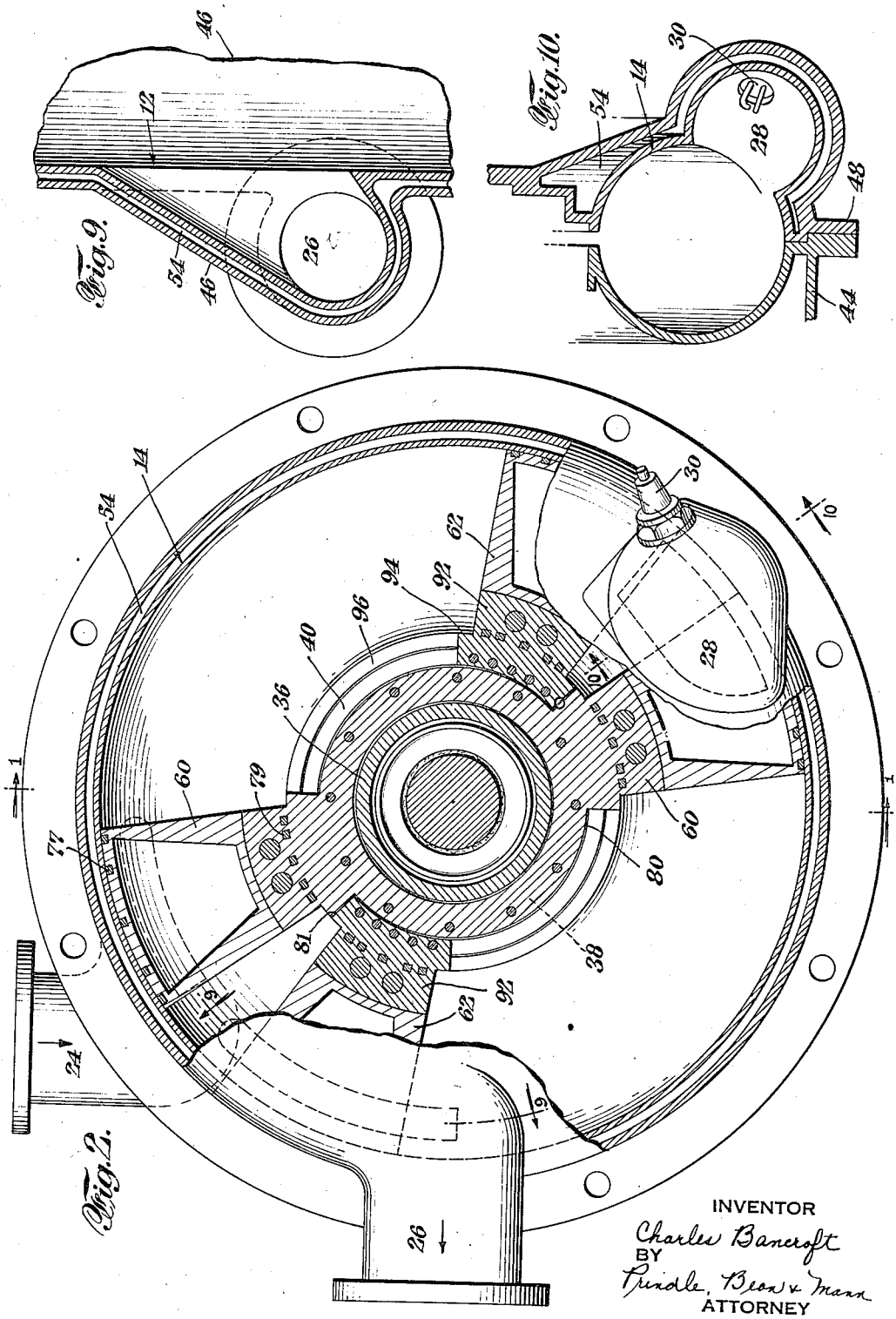

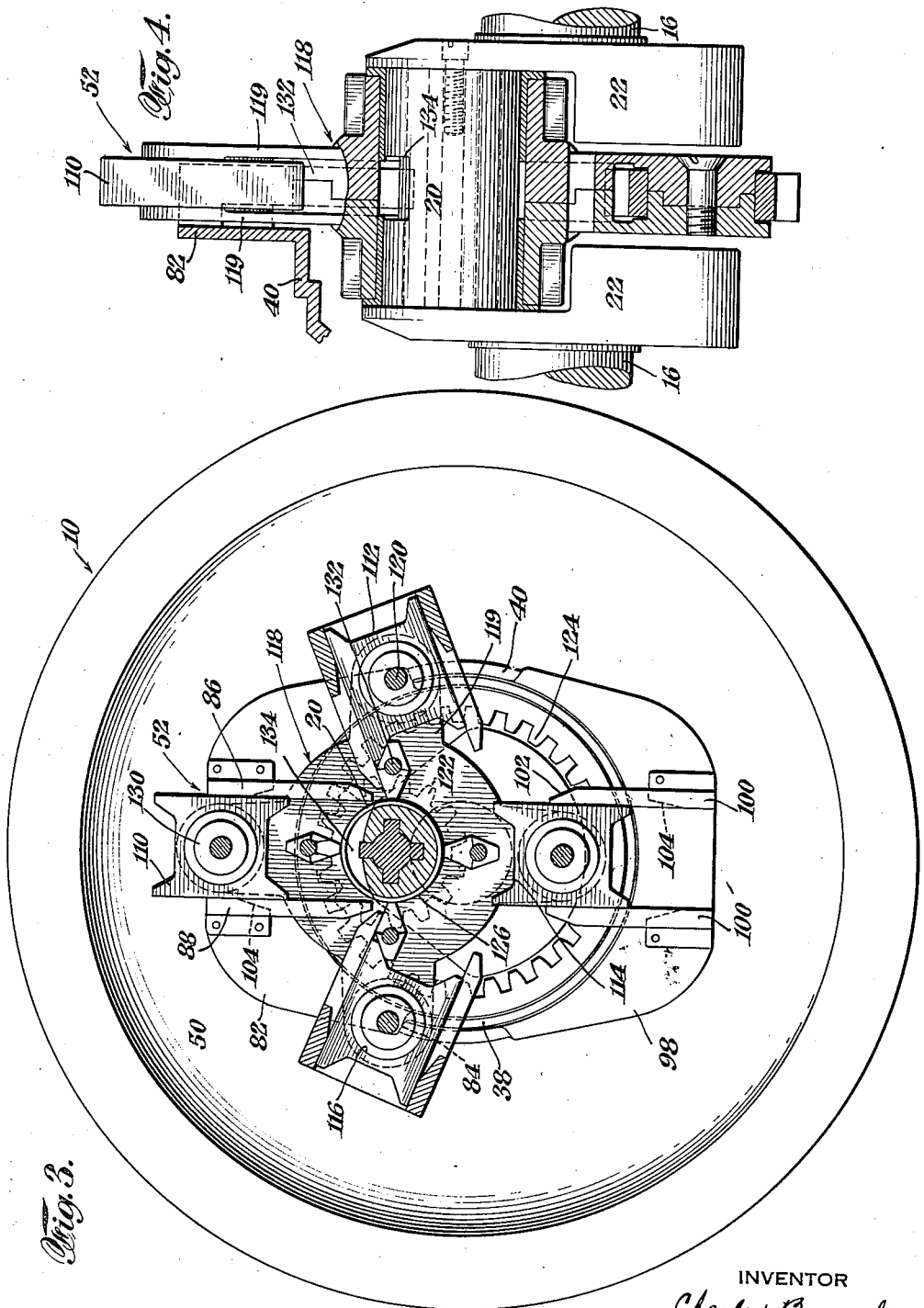

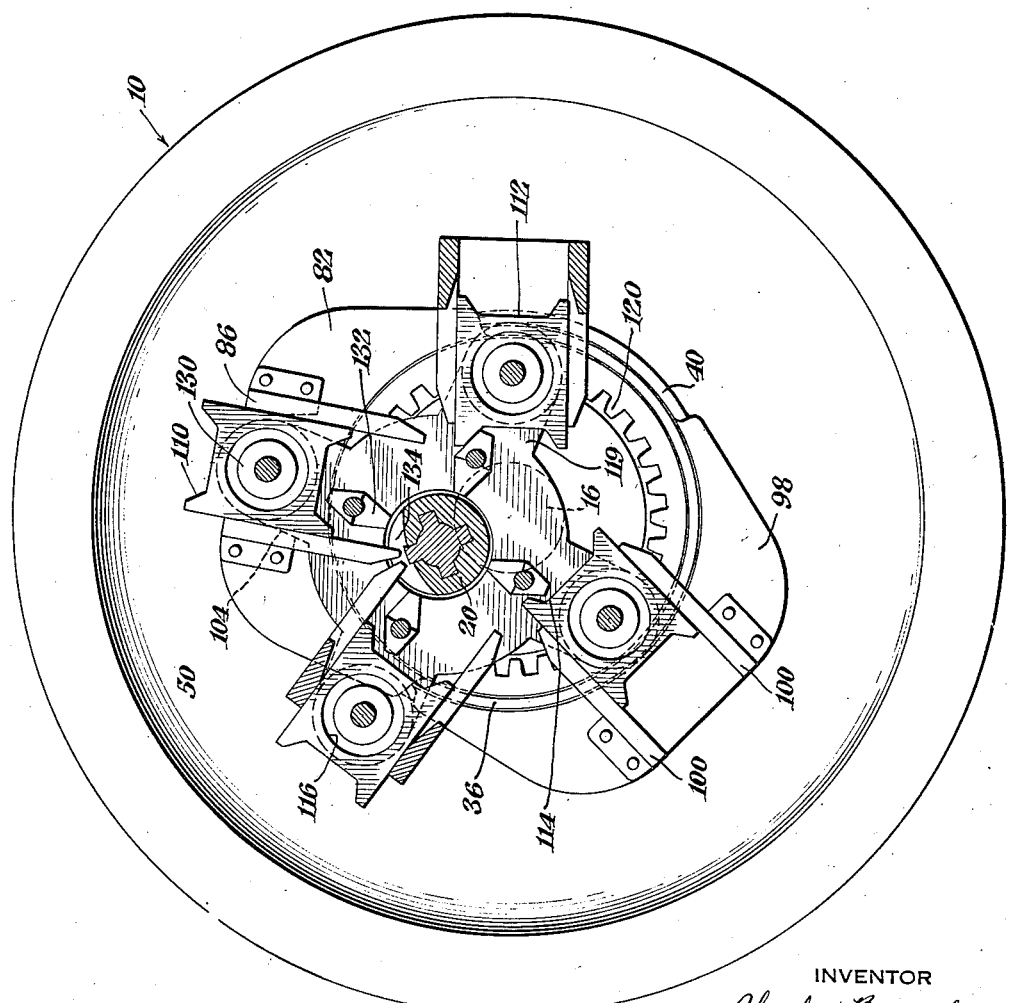

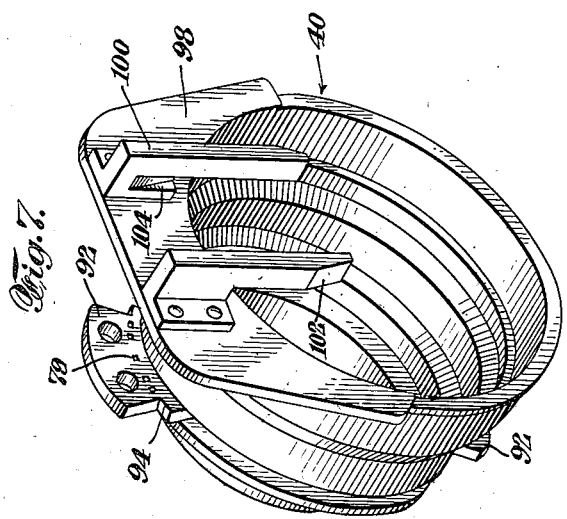
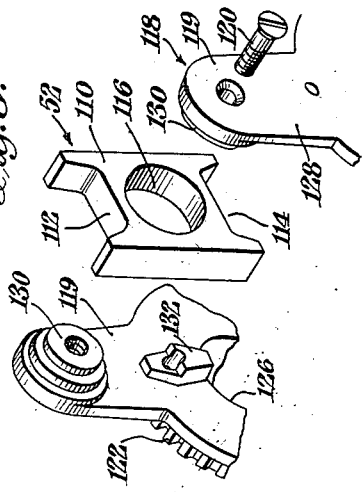
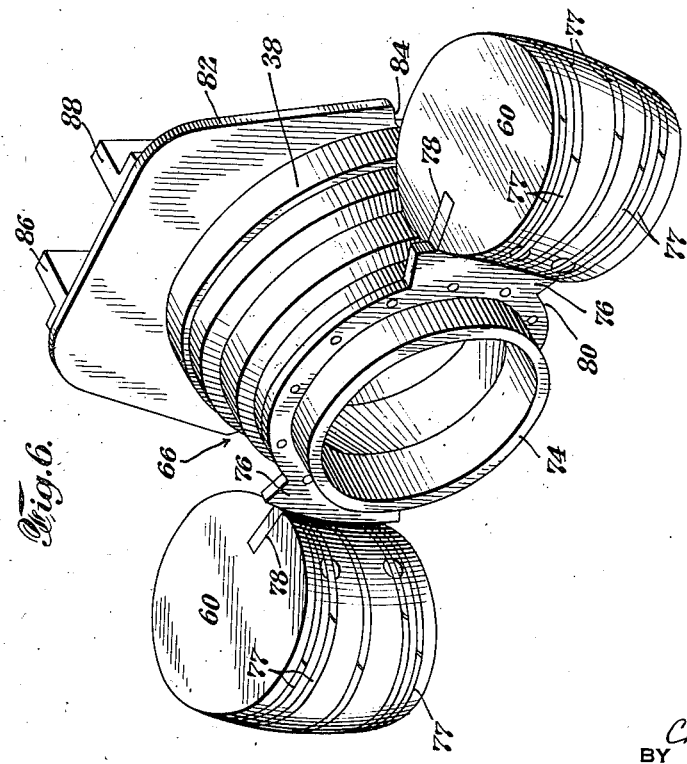

Nov. 17, 1936.                C. BANCROFT                2,061,131
                        ROTARY ENGINE CONSTRUCTION
                         Filed Nov. 14, 1935           8 Sheets-Sheet 6
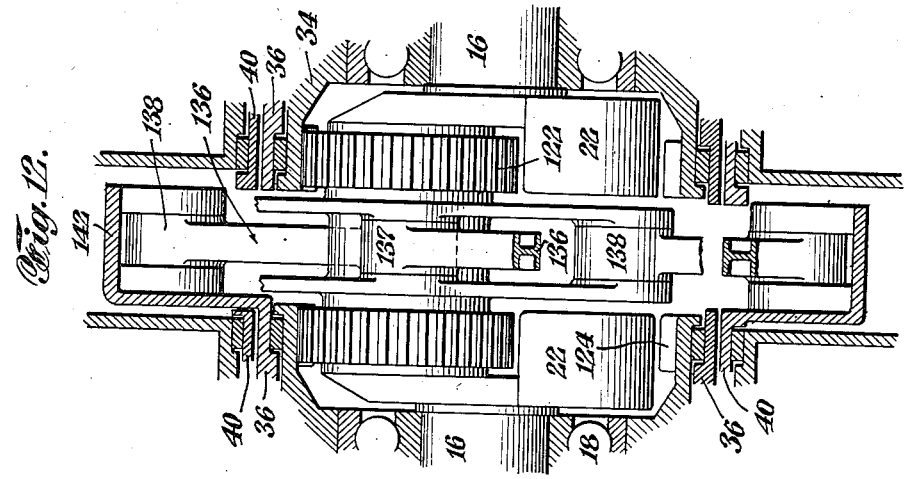
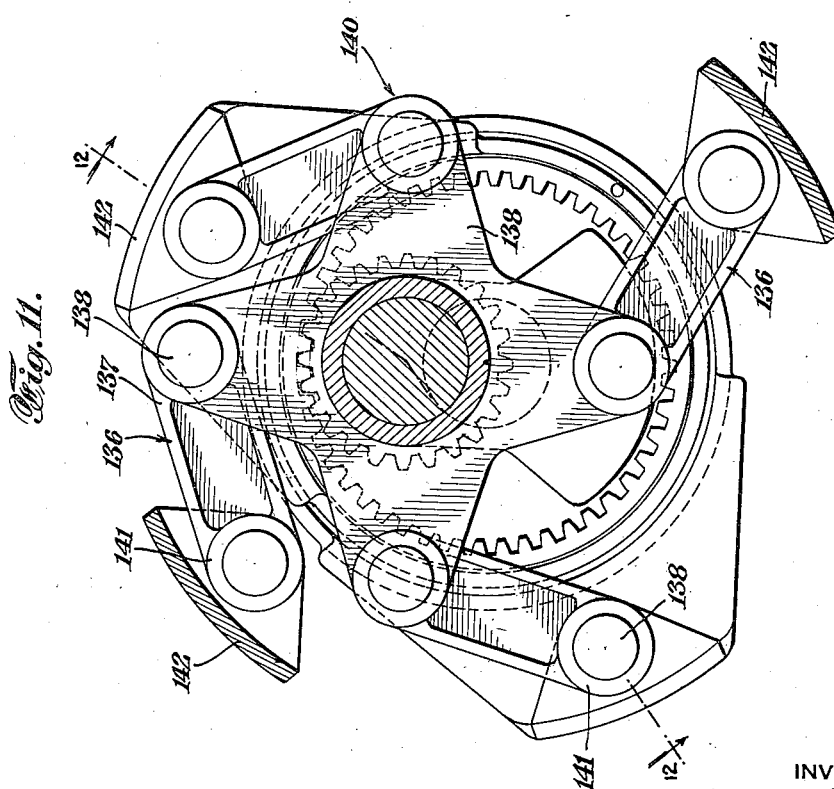
INVENTOR
Charles Bancroft
BY
Prindle, Bean & Mann
ATTORNEY Nov. 17, 1936.  C. BANCROFT  2,061,131
ROTARY ENGINE CONSTRUCTION
Filed Nov. 14, 1935    8 Sheets-Sheet 7
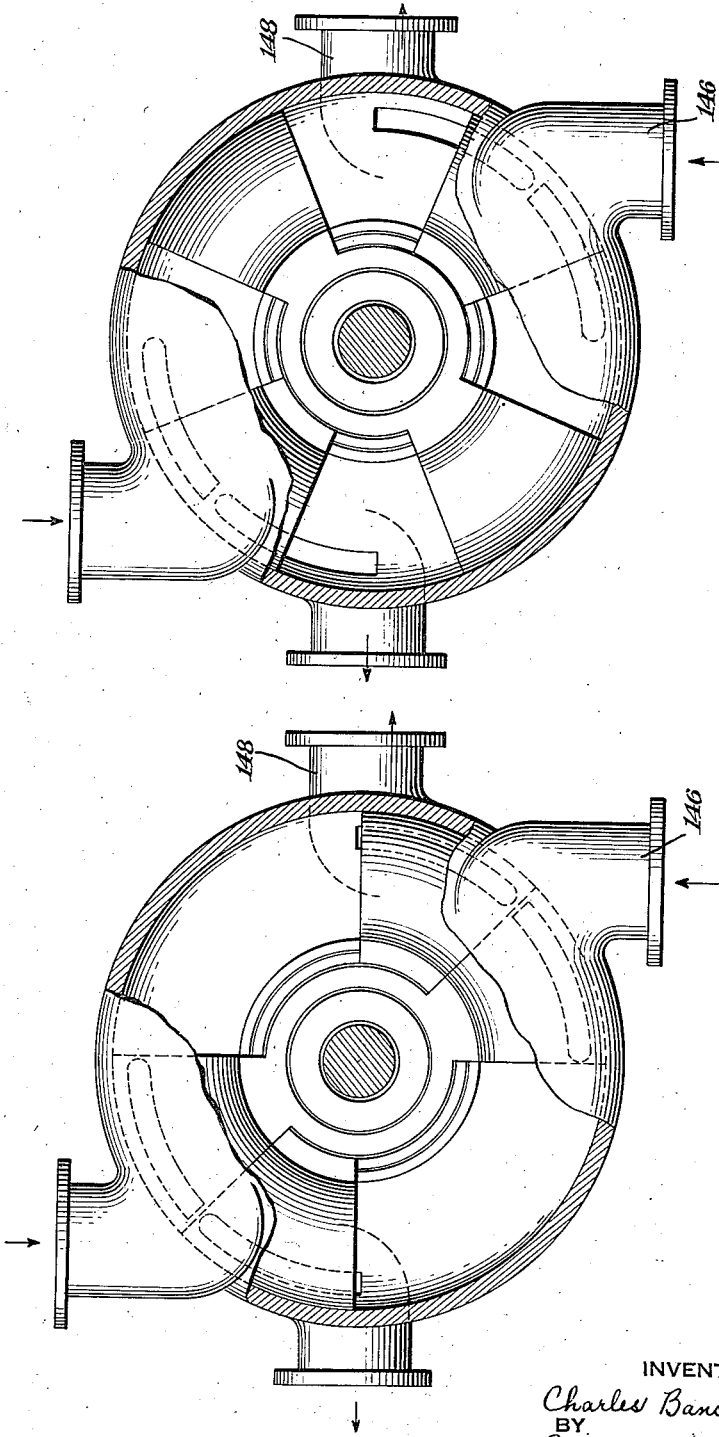
INVENTOR
Charles Bancroft
BY
Pindle, Bean & Mann
ATTORNEY

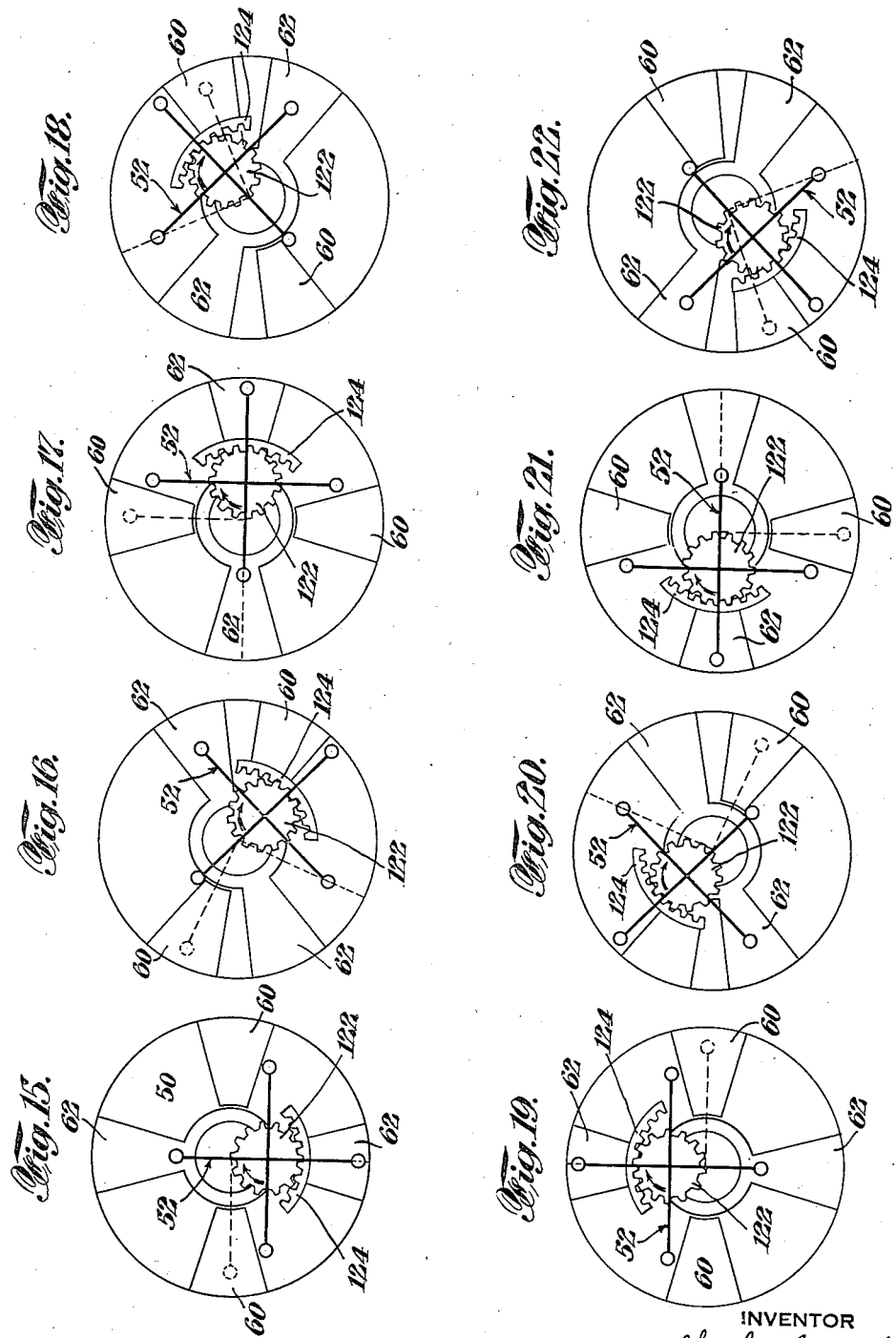

Patented Nov. 17, 1936

2,061,131

UNITED STATES PATENT OFFICE 2,061,131

ROTARY ENGINE CONSTRUCTION

Charles Bancroft, New Canaan, Conn.

Application November 14, 1935, Serial No. 49,662

14 Claims. (Cl. 123—11)

This invention relates to rotary pumps and internal combustion engines.

Prior rotary engines have not proven satisfactory because of their weight and many operating parts. In my apparatus each set of pistons is mounted in a cylinder of a stator on a separate sleeve, the sleeves being telescopically arranged and having coplanar flanges or flange portions for attachment to the pistons. The sleeves are also provided with guiding arms for cooperation with a spider or yoke means mounted on a crankpin of a crankshaft in the stator for controlling the relative positions of the sets of pistons. In addition my invention comprises tubular stationary sections surrounding portions of the shaft and provided with gearing to mesh with gears on the spider or yoke means. More specifically, my invention comprises the assembly of two working units provided with sets of pistons and with a spider means, common to both units, mounted on the crankpin for controlling the relative positions of the sets of pistons in the two working units. In this specific form the spider means is positioned between the working units and connected with the piston driving sleeves by means of sliding bearings. In another form of my invention I may use links or arms to connect the sleeves with the spider or yoke means. My apparatus may be used as an engine or as a pump.

In the drawings:

Fig. 2 represents a partial transverse section taken substantially on line 2—2 of Fig. 1;

Fig. 3 represents a portion of the device showing the single spider or yoke member and the bearing members associated with the flanges on the piston sleeves;

Fig. 4 represents an enlarged section taken through the spider or yoke member;

Fig. 5 represents the bearing members and the single spider or yoke member in a position different from that shown in Fig. 3;

Fig. 6 represents a perspective view of one set of pistons attached to a flange portion on a sleeve;

Fig. 7 represents a perspective view of the other sleeve in the same unit, the pistons being omitted;

Fig. 8 represents an exploded, partial view showing the connection between the single spider or yoke member and one bearing member;

Fig. 9 represents an enlarged partial sectional view of a part of the stator showing the exhaust from one of the chambers;

Fig. 10 represents a partial sectional view of one of the chambers in the stator and the combustion chamber;

Fig. 11 represents another form of single control member in which links or arms are substituted for the bearing members or blocks shown in Fig. 3;

Fig. 12 represents a section taken through the device shown in Fig. 11 with parts broken away to show the positions of the various arms or links; and Fig. 13 represents a front plan view of a pump showing the pistons in one position;

Fig. 14 represents another view of a pump with the pistons in another position; and Figs. 15 to 22 represent diagrammatic views showing the positions of the pistons in one unit during the operation of the device.

Figure 1:
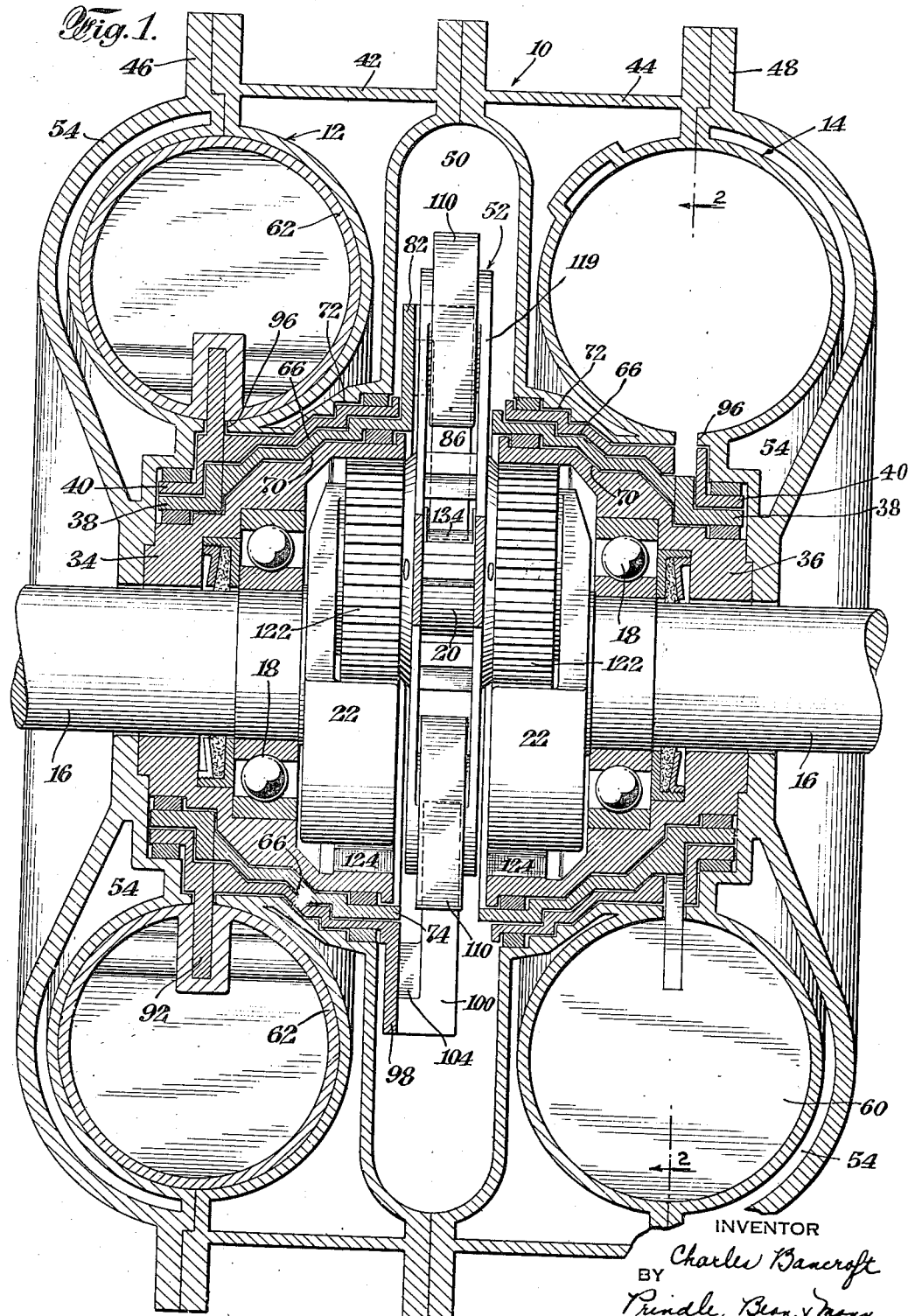
Fig. 1 represents an enlarged longitudinal section taken through a device made according to my invention with parts broken away to facilitate the disclosure.

Referring now to the drawings, the reference character 10 designates a stator provided with working chambers or units 12, 14 in the form of torus chambers. A crankshaft 16 is rotatably mounted in said stator in bearings 18 and has a single crankthrow or crankpin 20 between the working units. The crankthrow or crankpin may be provided with counter-balance weights 22. Each chamber or unit has an inlet and an outlet and a combustion chamber. As shown in Fig. 2, chamber or unit 14 is provided with an inlet 24 and an exhaust or outlet 26, and a combustion chamber 28 provided with a spark plug 30 (see Figs. 9 and 10). The stator 10 comprises a plurality of parts to facilitate the assembly and the parts may be bolted or otherwise secured together. The parts of the stator (see Fig. 1) are the central inner, tubular parts 34 and 36 in which the bearings 18 for shaft 16 are mounted and on which the sleeves 38 and 40 of the piston units (later to be described) are mounted, the middle sections 42 and 44 and outer sections 46 and 48. Also the fixed internal gears later to be described, are mounted on these tubular parts 34 and 36. The middle sections 42 and 44 form a middle chamber 50 to receive the single control member 52. The middle sections with the outer sections form the torus chambers or cylinders 12 and 14 for receiving the pistons. The stator is formed with a water jacket 54.

Rotatably mounted in each working unit are sets of pistons 60 and 62 (see Figs. 1 and 2, 6 and 7). A description of the pistons in one unit only will be given because the mounting of the pistons in the other unit is the same, the difference shown in the drawings being in the positioning of the pistons in the two units. In each unit each set of pistons is rigidly mounted on a sleeve, the inner sleeve 38 and the outer sleeve 40 being shown in section in Fig. 1 and in perspective in Figs. 6 and 7 respectively. These sleeves are of different sizes so as to be telescopically arranged and are of stepped formation 66 to form a labyrinth and to provide a seal against the escape of fluids from the working chambers to the crank case. The inner tubular parts 34 and 36 of the stator and the middle sections 42 and 44 adjacent the sleeves are of stepped formation as at 70 and 72 to cooperate with the stepped formation on the sleeves.

The inner sleeve 38 shown in Fig. 6 at its smaller end has a collar 74 from which extend the flanges or flange portions 76 to which the pistons 60 are attached. The pistons are formed as sections of a torus and are provided with sealing rings 77. The pistons have a slot 78 to receive the flanges 76. The flanges are provided with openings 79 to receive rings 77. The flanges are cut away at 80 to permit passage and movement of the other set of pistons in the same unit. The closest position of the pistons is shown in Fig. 2 where the flange portions 76 and 92 of the sleeve 38 and flange portion (later to be described as 92) of sleeve 40 substantially abut at 81. At its other end the inner sleeve has plate member 82 at right angles to the axis of the sleeve. The member 82 is cut away at 84 so as not to interfere with the movement of the plate member 98 on the other sleeve 40. Secured to the face of the plate member 82 are fingers 86 and 88 for cooperation with the single control member 52 to be later described. The construction of the fingers is substantially the same as the fingers on sleeve 40 which is shown in Fig. 7 and which will be described in the next paragraph.

The outer sleeve 40 shown in Fig. 7 has flanges 92 to which pistons 62 (omitted in Fig. 7) are attached by bolting or the like. The flanges are cut away at 94 to permit extension through of flange sections of other set of pistons in same unit and to permit relative motion of the two sets of pistons. It is to be noted that the flanges 76 on sleeve 38 and flanges 92 on sleeve 40 in each unit are coplanar and travel in the same opening 96 in the cylinder or working chamber. Outer sleeve 40 also has a plate member 98 provided with fingers 100 similar to the inner sleeve. The plate members 82 and 98 are coplanar. In the view shown in Fig. 7 the fingers are shown as beveled at their lower ends at 102 and grooved at 104 near their other ends to cooperate with parts of the single control member 52, and so as not to interfere with the operation of the apparatus in various positions as shown in Figs. 3 and 5. The plate members 82 and 98 and their respective fingers are mounted and rotate within the middle chamber 50 of the stator. Fingers 86 and 88 on plate member 82 of the inner sleeve are bevelled and cut away in the same manner as fingers 100 on the outer sleeve 40.

In the other working unit 12 it is to be understood that sets of pistons are mounted which are similar to those described in connection with the working unit 14 and each set of pistons has a plate member and attached fingers and bearing blocks associated with the single control member 52. These plate members and fingers also extend into middle chamber 50. The piston sets in chamber or unit 12 are positioned differently from those in unit 14 by virtue of being connected with different arms of spider member 52 and in order to get an orderly succession of firing or working strokes.

The single control member 52 which cooperates with the fingers on the plate members of the sleeves in both working units will now be described. Slidably mounted between each set of fingers on each sleeve is a block 110 having depressions 112 and 114 and a central opening 116. There are four blocks, one for each set of pistons. The blocks are mounted on the ends of a spider or yoke member 118 (see Figs. 4 and 8). This member 118 comprises two complementary parts 119 secured together by bolts 120. Each part has a gear 122 which meshes with stationary gearings 124 formed internally on the inner ends of parts 34 and 36 of the stator housing. Each part 119 also has a central opening 126 whereby the spider or yoke member 118 is rotatably mounted on the crankpin 29 of the crankshaft 16. Each part 119 of the member 118 has four arms 128 having projections 130 at their ends which fit into the opening 116 of each block and the bolts 120 secure the parts together. Mounted on each part of member 118 are complementary reinforcing diamond-shaped members 132. The parts 119 are spaced apart as shown in Fig. 4 to provide room in the the assembled member 118 to permit movement of the bearing fingers during the operation of the apparatus. The crankpin 29 is cut away at 134 to remove material from the crankpin in the path of the ends of the fingers during the operation of the apparatus.

In Figs. 11 and 12 I have shown a modified form of attachment of the spider or yoke means with the sleeves of the sets of pistons. Instead of the bearing blocks shown in the other form of my invention I use links or arms 136 each of which is pivotally attached at one end 137 to the ends 138 of the spider or yoke means 140. Each arm at its other end 141 is attached to one plate member 142 on the sleeves for each set of pistons. The shape of the plate members is slightly different to adapt them to links or arms rather than bearing members and it is not believed necessary to give a detailed description as the structure is similar to that shown in the other form. The operation of the apparatus is substantially the same as that shown in the previously described form of apparatus.

In Figs. 13 and 14 I have shown my invention applied to a pump. To change the engine to a pump, it is only necessary to eliminate the spark plug and firing chamber and install another inlet 146 and outlet 148 for the pumped liquid.

In Figs. 15 to 22 I have included diagrammatic views showing the positions of the pistons in one unit during one rotation of the crankshaft. The pistons in the other unit have the same cycle of rotation but the cycles are arranged so that there will be a combustion or explosion stroke in each unit alternately to obtain a balanced operation. The relative positions of the pistons are maintained by the single control member 52. In these figures the positions of the pistons are shown at positions corresponding to 45° interval movements of the crankshaft. Figs. 16, 18, 20, and 22 represent views similar to that shown in Fig. 2 of the drawings but with different pistons in the relative positions. These figures will be referred to in the following operation of the device.

The operation of the engine having two working units will now be given. The crankshaft 16 is started in one direction causing rotation of the pistons in the other direction, and a fuel mixture is drawn into one cylinder through inlet 24 by the relative rotation of the pistons in the unit. With the pistons in the position shown in Fig. 2 or Fig. 16 and the shaft beginning its rotation, piston 60 at the left will travel away from piston 62 (at the left) at a faster rate than piston 62 is travelling so as to form an induction stroke and the pistons assume the positions shown in Fig. 17 and Fig. 18, successively. Further rotation of the shaft causes the same piston 62 to travel at a faster rate than the same piston 60 is travelling to start to compress the charge drawn in as shown at the top and right in Fig. 19. At substantially maximum compression the pistons 60 and 62 at the right in Fig. 20 are positioned as shown in Figs. 2 and 20 adjacent the combustion chamber 28 and spark plug 30 and at this point the spark plug 30 is energized to ignite the compressed charge. The gases expand and piston 60 moves at a faster rate again than piston 62 as shown in Fig. 21 until the exhaust 26 is reached as shown in Figs. 2 and 22 when the pistons again approach each other to remove the burned charge and assume a position for the drawing in of the next charge. The variation in the movements of the pistons is obtained by the single control member 52 and the gearing 122 and 124. More particularly, as the shaft 16 rotates, crankpin 20 is rotated and, as the gears 122 are freely mounted on the crankpin and mesh with stationary gearing 124, the gears 122 will rotate in the opposite direction and will cause opposite rotation of the single control member 52 and with it the bearing blocks 110. The gears 122 drive the control member one revolution with respect to the stator in one direction for every revolution of the crankshaft in the other direction. The ratio of gear 122 to gearing 124 is chosen so that the pistons will be always together at, and only at, predetermined points. As the bearing blocks 110 are connected to the pistons 60 and 62 through the fingers 86, 88, 100 and the plate members 82, 98 of the sleeves 38, 40, the pistons will be rotated at varying speeds. The movements of the pistons in each unit are substantially the same for each cycle so that each piston takes up the position and movement of its preceding piston.

By means of the single connecting member or yoke member 52 and the associated parts, the pairs of pistons in each unit are rotated a certain amount independently of each other as well as a group, and means are provided for alternately speeding and slowing of each pair of pistons so that first one pair comes up to the preceding pair and then this latter pair moves away to catch up with the pair ahead of it. The pistons always rotate in the same direction but at varying speeds, and the pistons are together at predetermined points in their cycle of rotation and spread apart at other points. In this way the pistons form working chambers whereby rotation of the shaft 16 is brought about.

The crankshaft for purposes of assembly may be either of the splined construction or clamped crank cheek construction. The splined construction comprises interfitting portions each connected to a crank cheek. The clamped crank cheek construction comprises a crankpin fixed to one cheek and a clamp on the other cheek to engage the free end of the crankpin. Any other type of split crankshaft for facilitating the assembly of the control member 52 on the crankpin may be used. The control member 52 may be of split construction in which case the crankshaft would be of one-piece construction.

The pistons in each unit are arranged so that there is an orderly succession of working strokes in the engine as a whole. That is, there will be a combustion in each unit alternately to obtain balanced operation.

The operation of the modified form of my invention using links or arms instead of bearing members is substantially the same as above given and a detailed description is not believed necessary.

From the above the operation of a pump using my invention will be apparent.

From the foregoing it will be seen that I have set forth a new construction in which a single control member is utilized to provide a relatively simple and effective construction. This arrangement allows the driving arms and bearings on the piston driving sleeves in one unit to assist in balancing those in the other unit and is made possible through the mounting of the necessary stationary internal gears on internal tubular sections of the stator, which sections partially surround the crankshaft and lie within the piston driving sleeves.

What I claim is:

1. An apparatus of the character described, including, in combination, a stator having an inlet and outlet and provided with a cylinder in the form of a torus chamber, a single throw crankshaft rotatably mounted in said stator, a geared member rotatably mounted on said crankthrow of said crankshaft, a stationary tubular section within said stator and surrounding a portion of said crankshaft, said tubular section having a fixed internal gear on its inner end for meshing with said geared member, hollow sleeves surrounding said tubular section, a set of pistons secured to each sleeve and adapted to rotate in said cylinder, and means for connecting said sleeves with said geared member for controlling the rotation of said sleeves and their respective pistons so as to cause alternate acceleration and deceleration of said pistons to form expanding and contracting chambers between said pistons and said cylinder walls for drawing in and exhausting fluids through said inlet and outlet of said stator.

2. A motor of the character described including, in combination, a stator, a shaft having a crankpin and rotatably mounted in said stator, said stator including an internal tubular extension surrounding a portion of said shaft, two sets of pistons having a common axis of rotation in said stator, a member to control the rotation of said pistons and mounted on said crankpin, telescoping sleeves for connecting said member with said sets of pistons, there being one sleeve for each set of pistons, said sleeves being rotatably mounted on said tubular extension, said tubular extension being provided with gearing, said member having driving gears meshing with said gearing on said tubular extension for controlling the positions of said pistons during the operation of the device.

3. An apparatus of the character described, including, in combination, a stator having inlets and outlets and provided with a plurality of cylinders, each cylinder being in the form of a torus chamber, a single throw crankshaft rotatably mounted in said stator, geared members rotatably mounted on said crankthrow of said crankshaft, stationary tubular sections within said stator and surrounding a portion of said crankshaft, each tubular section having a fixed internal gear on its inner end for meshing with a geared member, hollow sleeves surrounding each of said tubular sections, a set of pistons secured to each sleeve and adapted to rotate in said cylinders, and means for connecting said sleeves with said geared members for controlling the rotation of said sleeves and their respective pistons so as to cause alternate acceleration and deceleration of said pistons in each cylinder to form expanding and contracting chambers between said pistons and said cylinder walls for drawing in and exhausting fluids through said inlets and outlets of said stator.

4. A motor of the character described including, in combination, a stator, a shaft having a crankpin and rotatably mounted in said stator, said stator including internal tubular extensions surrounding portions of said shaft, two sets of pistons at each side of said stator and having common axes of rotation in said stator, a common member to control the rotation of the sets of said pistons and mounted on said crankpin, telescoping sleeves for connecting said common member with said sets of pistons, there being one sleeve for each set of pistons, said sleeves being rotatably mounted on said tubular extensions, said tubular extensions being provided with gearings, said common member having driving gears meshing with said gearings on said tubular extension for controlling the positions of said pistons during the operation of the device.

5. A motor of the character described, including, in combination, a stator, a shaft having a crankpin and rotatably mounted in said stator, said stator including an internal tubular extension surrounding a portion of said shaft, two sets of pistons having a common axis of rotation in said stator, a member to control the rotation of said pistons and mounted on said crankpin, telescoping sleeves for connecting said member with said sets of pistons, there being one sleeve for each set of pistons, said sleeves being rotatably mounted on said tubular extension, said tubular extension being provided with gearing, said member having driving gears meshing with said gearing on said tubular extension for controlling the positions of said pistons during the operation of the device, said member also having bearing blocks, said sleeves being provided with bearing fingers to cooperate with said bearing blocks, said member having cut away portions to receive and permit movement of said bearing fingers in said member during the operation of the motor.

6. A motor of the character described, including, in combination, a stator, a shaft having a crankpin and rotatably mounted in said stator, said stator including an internal tubular extension surrounding a portion of said shaft, two sets of pistons having a common axis of rotation in said stator, a member to control the rotation of said pistons and mounted on said crankpin, telescoping sleeves for connecting said member with said sets of pistons, there being one sleeve for each set of pistons, said sleeves being rotatably mounted on said tubular extension, said tubular extension being provided with gearing, said member having driving gears meshing with said gearing on said tubular extension for controlling the positions of said pistons during the operation of the device, said member also having bearing blocks, said sleeves being provided with bearing fingers to cooperate with said bearing blocks, said member having cut away portions to receive and permit movement of said bearing fingers in said member during the operation of the motor, said crankpin having a cut away portion to receive and permit passage of said bearing fingers during the operation of the apparatus.

7. An apparatus of the character described, including, in combination, a stator, a shaft having a crankpin and rotatably mounted in said stator, said stator being provided with a cylinder in the form of a torus or ring chamber, two pairs of pistons in said cylinder, sleeves rotatably mounted in said stator, there being one sleeve for each pair of pistons, means for connecting said sleeves to said pistons, said means including flanges on said sleeves to which said pistons are secured, said flanges being coplanar and being cut away so that they abut each other in certain positions when said pistons are close together, said chamber being provided with a single slot for receiving said coplanar flanges, said pistons being grooved to receive piston sealing rings and said flanges being drilled at points coinciding with said piston grooves to receive said piston rings.

8. An apparatus of the character described, including in combination a stator having inlets and outlets, a shaft provided with a crankpin, a plurality of chambers, a plurality of sets of pistons in each chamber, telescoping sleeves associated with said pistons, means for connecting said sets of pistons to said sleeves, said means including alined flanges on said sleeves which are cut away to permit the pistons of each set to have movement relative to another set and permit the pistons of the sets in each chamber to approach each other, common means mounted on said crankpin of said shaft and connected with said sleeves for transferring power from said pistons of both chambers to said shaft, said common means including a plurality of driving bearing blocks reciprocably mounted with respect to said sleeves and connected with a rotatable spider mounted on said crankpin, said spider being provided with gears, gearing on the interior of said stator for meshing with said gears for causing rotation of said shaft when said pistons are rotated.

9. A device of the character described, including, in combination, a hollow cylindrical stator comprising separate engine units, a shaft having a crankpin in said stator, a plurality of sets of pistons rotatably mounted in one of said units and capable of a certain amount of rotation independently of each other as well as rotation in said unit as a group, a plurality of sets of pistons rotatably mounted in said other unit and capable of a certain amount of rotation independently of each other as well as rotation in said unit as a group, and means common to all said pistons for alternately speeding and slowing of each piston in each unit, the pistons at predetermined positions being always together and at other predetermined positions in each unit being spread apart, said means including telescoping sleeves having flange portions connected with said pistons in each unit, said flange portions being coplanar, said sleeves having guiding arms, bearing blocks guided by said guiding arms, a yoke member connected with said bearing blocks and rotatably mounted on said crankpin of said shaft, said yoke member being provided with gears, the interior of said stator being provided with gearing for meshing with said gears to cause rotation of said shaft when said pistons are rotated.

10. A device of the character described, including, in combination, a hollow cylindrical stator comprising separate engine units, a crankshaft having a crankpin in said stator, a plurality of sets of pistons rotatably mounted in one of said units and the sets of pistons being capable of a certain amount of rotation independently of each other as well as rotation in said unit as a group, a plurality of sets of pistons rotatably mounted in said other unit and capable of a certain amount of rotation independently of each other as well as rotation in said unit as a group, and means common to all said sets of pistons for alternately speeding and slowing of each piston set in each unit, the pistons at predetermined positions being always together and at other predetermined positions in each unit being spread apart, said means including telescoping sleeves having flange portions connected with said pistons in each unit, said flange portions being coplanar, said sleeves having guiding fingers, bearing blocks guided by said guiding fingers, a yoke member connected with said bearing blocks and rotatably mounted on said crankpin, said yoke member being provided with gears, the interior of said stator being provided with gearing for meshing with said gears, said sleeves being of a complementary stepped formation to form a labyrinthic construction.

11. A device of the character described, including, in combination, a stator having a plurality of working units, a crankshaft having a crankpin in said stator, an inlet and outlet for each unit, a plurality of sets of pistons rotatably mounted in one of said working units in said stator and means for alternately speeding and slowing of each piston set so that during the cycle of operation certain of the piston faces are together at predetermined points and other faces are spaced apart at all other points so as to form working chambers in said unit, a plurality of sets of pistons rotatably mounted in another working unit, said pistons in said second mentioned unit being associated with said means for alternately speeding and slowing said first mentioned piston sets so that during the cycle of operation in said second mentioned unit certain of the piston faces are together at predetermined points and other faces are spaced apart at all other points to form working chambers in said second mentioned unit, said means including telescoping sleeves provided at one end with guiding fingers, bearing blocks guided by said guiding arms, a yoke member having gears, said bearing blocks being connected with said yoke member, and gearing on the interior of said stator for meshing with said gears, said yoke member being mounted on said crankpin for rotating said crankshaft.

12. A device of the character described, including, in combination, a stator having a plurality of working units, a crankshaft having a crankpin in said stator, an inlet and an outlet for each unit, a plurality of sets of pistons rotatably mounted in one of said working units in said stator and means for alternately speeding and slowing of each piston set so that during the cycle of operation certain of the piston faces are together at predetermined points and other faces are spaced apart at all other points so as to form working chambers in said unit, a plurality of sets of pistons rotatably mounted on another working unit, said pistons in said second mentioned unit being associated with said means for alternately speeding and slowing said first mentioned pistons so that during the cycle of operation in said second mentioned unit certain of the piston faces are together at predetermined points and other faces are spaced apart at all other points to form working chambers in said second mentioned unit, said means including sleeves connected to said pistons, a yoke member rotatably mounted on said crankpin for rotating said crankshaft and means for connecting said yoke member to said sleeves.

13. An apparatus of the character described, including, in combination, a stator, a shaft rotatably mounted therein and formed with a crankpin, a working chamber in said stator, a plurality of sets of pistons rotatably mounted in said chamber, telescoping sleeves provided with coplanar flange portions for connection with said pistons and means for controlling the relative positions of said pistons during the operation of the apparatus, said means including a spider rotatably mounted on said crankpin.

14. An apparatus of the character described, including, in combination, a stator, a shaft having a crankpin and rotatably mounted in said stator, said stator being provided with a cylinder in the form of a torus or ring chamber, two pairs of pistons in said cylinder, sleeves rotatably mounted in said stator, there being one sleeve for each pair of pistons, means for connecting said sleeves to said pistons, said means including flanges on said sleeves to which said pistons are secured, said flanges being coplanar and being cut away so that they abut each other in certain positions when said pistons are close together, said chamber being provided with a single slot for receiving said flanges.

CHARLES BANCROFT.

CERTIFICATE OF CORRECTION.

Patent No. 2,061,131. November 17, 1936

CHARLES BANCROFT.

It is hereby certified that error appears in the printed specification of the above numbered patent requiring correction as follows: Page 3, first column, line 21, after the reference numeral "60" insert the words at the bottom in Fig. 20; and that the said Letters Patent should be read with this correction therein that the same may conform to the record of the case in the Patent Office.

Signed and sealed this 16th day of February, A. D. 1937.

(Seal)

Henry Van Arsdale
Acting Commissioner of Patents.